United States Patent [19]

Itoh

[11] Patent Number: 4,969,205

[45] Date of Patent: Nov. 6, 1990

[54] RADIO COMMUNICATION SYSTEM

[75] Inventor: Koichi Itoh, Hino, Japan

[73] Assignee: Kabushiki Kaisha Toshiba, Kawasaki, Japan

[21] Appl. No.: 214,272

[22] Filed: Jul. 1, 1988

[30] Foreign Application Priority Data

Jul. 3, 1987 [JP] Japan .............................. 62-166744

[51] Int. Cl.$^5$ .............................................. H04B 1/00

[52] U.S. Cl. ........................................ 455/54; 455/68; 455/186; 379/61; 379/63

[58] Field of Search ..................... 455/53, 54, 68, 185, 455/186; 379/60, 61, 63; 455/33-34

[56] References Cited

U.S. PATENT DOCUMENTS

| | | | |
|---|---|---|---|
| 4,380,826 | 4/1983 | Usugi | 455/185 |
| 4,688,261 | 8/1987 | Killoway et al. | 455/186 |
| 4,694,485 | 9/1987 | Iwase | 379/61 |
| 4,744,101 | 5/1988 | Saegusa | 379/63 |
| 4,768,219 | 8/1988 | Yamagata | 379/61 |
| 4,768,220 | 8/1988 | Yoshihara et al. | 379/63 |
| 4,776,001 | 10/1988 | Murata et al. | 379/63 |
| 4,783,780 | 11/1988 | Alexis | 379/63 |
| 4,794,635 | 12/1988 | Hess | 379/60 |

FOREIGN PATENT DOCUMENTS 583770 5/1989 Australia .

*Primary Examiner*—Reinhard J. Eisenzopf
*Assistant Examiner*—Andrew Faile
*Attorney, Agent, or Firm*—Finnegan, Henderson, Farabow, Garrett and Dunner

[57] ABSTRACT

A plurality of control channels different frequency is used at equal frequencies to couple a base unit and radio communication terminal unit. A radio communication device uses the plurality of control channels sequentially or at equal frequencies by switching operations to thereby transmit and/or receive information on talking channels, etc. When a particular control channel is occupied for a long time due to cross talk, etc., another control channel is selected for telephone communication purposes.

42 Claims, 12 Drawing Sheets

RADIO COMMUNICATION SYSTEM

BACKGROUND OF THE INVENTION

1. Field of the Invention

This invention relates to radio communication systems of a multichannel access type which detect an unoccupied one of a plurality of radio channels to transmit/receive voice and data and, more particularly, to radio communication systems which ensure a quantity of traffic by using a plurality of control channels.

2. Description of the Related Art

FIG. 7 is a block diagram of a conventional structure of a radio communication system of this type. In FIG. 7, a base unit 1 is connected to a radio telephone 2 via a radio circuit and also to a wire-telephone line 3.

A signal incoming from the telephone line 3 is input via a hybrid circuit 4 to a transmitting unit 5 to modulate a carrier wave therein. The signal modulated by the transmitting unit 5 is transmitted via an antenna duplexer 6 from an antenna 7 to a radio telephone 2.

In the base unit, the electric waves transmitted by the radio telephone 2 are received by a receiving antenna 7 and demodulated by a receiving unit 8 via the antenna duplexer 6. The demodulated signal is transmitted via the hybrid circuit 4 to the wire-telephone line 3.

A synthesizer 9 outputs to the transmitting and receiving units 5 and 8 a signal having a frequency corresponding to radio channel means including a talking channel and a control channel. In that case, the control channel constituting part of the radio channel means is one in number and the talking channel is two or more.

One output from the receiving unit 8 is input to a received-field strength detector sensor 10 to determine the field strength. The detector 10 is generally referred to as a carrier squelch circuit or a noise squelch circuit. Another output comprising a data signal contained in the demodulated received signal is input to an identification signal detector 11 which checks an identification signal determined by a combination of the base unit 1 and the radio telephone 2. The identification signal is generally referred to as an ID code.

The detector outputs and the demodulated data signal are input to a control circuit 12 to be used for the purpose of connection control. Further, the control circuit 12 controls the synthesizer 9 to switch among the radio channels and to cause data to be input to the transmitting unit for modulating purposes.

Similarly, the radio telephone 2 includes a receiving antenna 13, a receiving unit 14 and an antenna duplexer 18. The demodulated output from the receiving unit 14 is input to a receiver 15. Voice input by a transmitter microphone 16 becomes a modulation input to the transmitting unit 17 to modulate the carrier therein and the modulated signal is transmitted via the antenna duplexer 18 from the antenna 13.

A synthesizer 19, a received-field strength detector 20, and an identification signal detector 21 are equivalent to the corresponding ones of the base unit 1. A control circuit 22 controls the whole radio telephone 2. A loudspeaker 23 is a sounder which generates a ringing tone when there is an incoming call. The base unit 1 has an AC plug 24 connected to an AC 100 V power source and the output from a rectification stabilizer 25 is supplied to the respective circuits of the system. The output from the stabilizer 25 is also supplied via a current control resister 26 and charging terminals 27, 28 to a chargeable battery 29 which is used as a power source for the radio telephone 2. In this conventional example, control is performed as schematically shown in a flowchart of FIG. 8 when there is an incoming call. When the base unit 1 detects an incoming call signal from the wire-telephone line 3 using a calling signal detector 30 when the base unit is on standby (step 33), it checks to see if the control channel C-CH is unoccupied (step 34). If so, the oscillating frequency of the synthesizer 9 is set to a control channel frequency, and turns on the transmitting unit 5 to thereby cause the incoming signal to be transmitted (step 35). In this case, the incoming signal contains a signal designating a talking channel S-CH.

The radio telephone 2 turns on the synthesizer 19 for a predetermined time t1 set in a timer (not shown) when it is on standby, sets the oscillating frequency of the synthesizer at the control channel frequency, and turns on the receiving unit 14 (step 36). At this time, when there is an incoming signal received (step 37), the transmitting unit 17 is turned on (step 38), an acknowledge signal is transmitted (step 39), and the designated talking channel S-CH is selected (step 45). If there is no incoming signal received, the synthesizer 19 and receiving unit 17 are turned off for a predetermined time t2 (step 40). Intermittent reception of a signal by turning on and off the receiver 14 is for energy saving purposes.

If the consumption current flowing through the receiving unit which is off is Ioff and the consumption current flowing through the receiving unit which is on is Ion, the average consumption current I flowing when the receiving unit is on standby becomes $I=(1/t1+t2)\times(t1\cdot Ion+t2\cdot Iof)$. Since usually Ion>>Ioff, I is reduced.

When the base unit 1 detects the electric waves from the radio telephone 2 by the received-field strength detector 10 (step 41), it stops transmission of the incoming signal (step 42). At this time, if no electric waves from the radio telephone 2 are detected, the incoming signal continue to be transmitted up to a predetermined number of times n (step 43). The reason for this is that the radio telephone 2 receives signals intermittently and cannot receive signals during the time interval t2. The reason why the transmission is terminated after the n-time transmission is to avoid useless occupation of the control channel, for example, when the radio telephone 2 is turned off or when the telephone 2 is located at a position excessively remote from the base unit 1.

When the ID codes coincides (step 44), the S-CH designated by the incoming signal is selected. If the ID codes do not coincide, the base unit waits for the disappearance of the call from the wire-telephone line 3 (step 57) and returns to its standby state because the telephones of other communication devices may respond.

After S-CH is selected, the base unit 1 transmits a bell ringing signal (step 47). When the radio telephone 2 receives this signal (step 48), the sounder 23 sends a ringing tone (step 49). When the switch 31 is manually switched on in response to the ringing tone to thereby perform the off-hook operation (step 50), the telephone 2 sends outs an off-hook signal (step 51) and enables telephone communication (step 55).

On the other hand, when the base unit 1 receives the off-hook signal step 52 , it stops transmission of the bell ringing signal (step 53), closes a line relay 33 to establish a communication loop with the wire-telephone line 3 to enable telephone communication (step 54).

After the number of transmissions has become n, the base unit 1 detects the termination of the incoming signal from the telephone line 3 (step 56) and returns to its standby position to thereby prevent a wasteful repetition of the above operations caused by the incoming signal.

The operation of transmission from the radio telephone 2 is shown in a flowchart of FIG. 9. When the switch 31 is switched on to call the wire-telephone line 3, the control circuit 22 responds to this switching operation and determines that it should cause transmission to be performed (step 57), locks the oscillating frequency of the synthesizer 19 to the frequency of the control channel, and turns on the receiving unit 14 to cause the same to receive electric waves through the control channel C-CH (step 58). The telephone 2 detects the field strength of the electric waves received through the control channel by the signal from the received-field strength detector 20. If the received field effect is not higher than a predetermined value, the radio telephone determines that the control channel is unoccupied (step 59), and turns on the transmitting unit 17 to cause same to transmit the ID code signal allocated to the telephone 2 (step 60). When the base unit 1 receives this ID code signal, it determines whether the ID code coincides with the ID code allocated to the combination of the base unit 1 and radio telephone 2 (steps 61, 62). If so, the base unit 1 turns on the transmitting unit 5 to thereby cause same to transmit to the radio telephone 2 a response signal comprising the ID code and the information designating S-CH) (step 63).

The telephone 2 receives the response signal from the base unit 1 by means of the control channel (step 64), and determines whether the ID code contained in the response signal coincides with the ID code allocated to the telephone 2 (step 65). If so, the telephone 2 switches the oscillating frequency of the synthesizer 19 to the frequency of the talking channel designated by the base unit 1 (step 66). After having transmitted the response signal, the base unit 1 also changes the oscillating frequency of the synthesizer 9 to the frequency of the talking channel designated for communication purposes (step 67). Thus the base unit 1 and telephone 2 are connected to the talking channel designated by the base unit 1. Thereafter, by the dialing operation using a dial key 32, the telephone 2 can call the telephone connected to the wire-telephone line 3 to thereby enable telephone communication.

If the telephone 2 receives no response signal from the base unit 1 a time t3 after it has transmitted the ID code signal because the telephone is excessively distant from the base unit 1 or for some other reason, the control circuit 22 causes the loudspeaker 23 to produce an alarm sound after a lapse of time t3 to thereby inform that the connection is impossible (steps 68, 69).

As described above, the conventional radio communication apparatus checks to see if the single control channel is unoccupied, uses the channel to transmit the ID code signal if the channel is unoccupied, and transmits/receives information on a talking channel used for communication if the channel is unoccupied. The reason why the radio communication apparatus checks to see if the control channel is unoccupied is to prevent interference with another radio telephone, which is being connected, caused by transmitting electric waves.

In order to ensure a large amount of traffic, it is necessary to dispose a plurality of radio communication apparatus, each including such base unit 1 and such radio telephone 2 and to increase the whole number of talking channels.

There is the problem that even if a plurality of radio communication apparatus having the conventional structure is used, it is impossible to ensure a quantity of traffic satisfying an increase in the number of talking channels because the control channel of each apparatus is the same, so that the frequency of use of the control channel increases in proportion to an increase in the talking channels and hence the waiting time taken until an unoccupied state of the control channel is obtained increases. Furthermore, as the waiting time for an unoccupied control channel increases, as soon as the control channel becomes unoccupied, a plurality of radio communication apparatus start to transmit signals simultaneously to thereby cause cross talk among them.

In addition, for example, as shown in FIG. 10, assume that radio communication apparatus are disposed, one including such base unit 1 and such radio telephone 2 and the other including such base unit 1′ and such radio telephone 2′. Furthermore assume that when there is an incoming signal from the wire-telephone line 3 to the base unit 1, that the base unit 1′ is in telephone communication with radio telephone 2′ using frequencies f1 and f1′. respectively, in the talking channels adjacent to the control channel and that the radio telephone 2′ is located at a position very close, to the base unit 1. In that case, the electric waves having the transmission frequency f1 from the radio telephone 2′ leak to the control channel of the base unit 1 and that the received-field strength detector 10 of the base unit 1 continues to output the signal "there is a received electric-field". In that case, the base unit 1 cannot proceed to a step 33 and subsequent steps of FIG. 8 until the telephone 2′ terminates its communication, so that the base unit 1 cannot virtually be used.

FIG. 11 shows that base units shown by reference numerals 1, 1′ and 1″ and radio telephones shown by reference numerals 2, 2′ and 2″ are disposed such that the base units 1, 1′ and 1″ are connected to radio telephone lines 3, 3′ and 3″, respectively. It is assumed that the telephone 2″ in the vicinity of base unit 1 is in telephone communication with the base unit 1″ through talking channels having frequencies f2 and f2′ adjacent to the control channel and that the radio 2′ is in telephone communication with the base unit 1′ through talking channels having the frequencies f1 and f1′ in the same state as in FIG. 10. In that case, at the base unit 1 which has received an incoming call from the wire-telephone line 3, the mutual modulation $2f1-f2=fc$ ($fc$ = the frequency of the control channel) is caused by the frequencies f1 and f2 electric waves, which is the same state as when the control channel has received electric waves. Thus the base unit 1 cannot be used until the talk between the telephone 2′ and 2″ is terminated as in FIG. 10.

This applies to the radio telephones. By the arrival of the leaking electric waves or the mutual modulated electric waves at the control channel, the telephones cannot proceed past step 59 and subsequent steps of FIG. 9 and cannot be used. Such a state may be caused by an EMI radiation generated by electronic devices and it is impossible to ensure a required quantity of traffic.

It is an object of this invention to provide a radio communication apparatus which ensures a large amount of traffic and is not influenced by cross talk and electric-wave interference.

SUMMARY OF THE INVENTION

In order to achieve the above object, the present invention uses control channel means constituted by a plurality of control channels which are used with equal frequencies to couple base units and the corresponding radio communication terminal units.

The present invention provides a radio communication system comprising:

- a plurality of radio communication devices, each including a base unit and a radio terminal unit coupled thereto via a radio circuit;
- each radio communication device comprising;
- means for coupling the base unit and a radio terminal unit using one control channel means selected among a plurality of control channel means different in frequency;
- means for storing data on one control channel means; and
- means for rewriting the stored data on the control channel means;
- the respective control channel means being selected.

A radio communication device uses a plurality of control channel means sequentially or at random periods with equal frequencies to transmit and/or receive information on talking channels, etc. Therefore, when a plurality of radio communication devices issued, the probability that at least one of the control channels used in the communication devices will be unoccupied increases to thereby ensure a quantity of traffic satisfying the number of talking channels. When a particular control channel is occupied over a long time due to cross talk, etc., another control channel is selected to thereby perform connection for telephone communication. Therefore, the system is less influenced by cross talk and/or interference of electric waves.

As just described above, the present invention performs connection control by providing a plurality of control channel means, so that an inability of connection is avoided even if a plurality of radio communication devices is disposed, and a quantity of traffic satisfying the total number of talking channels is ensured.

DESCRIPTION OF THE PREFERRED EMBODIMENT

Figure 1:
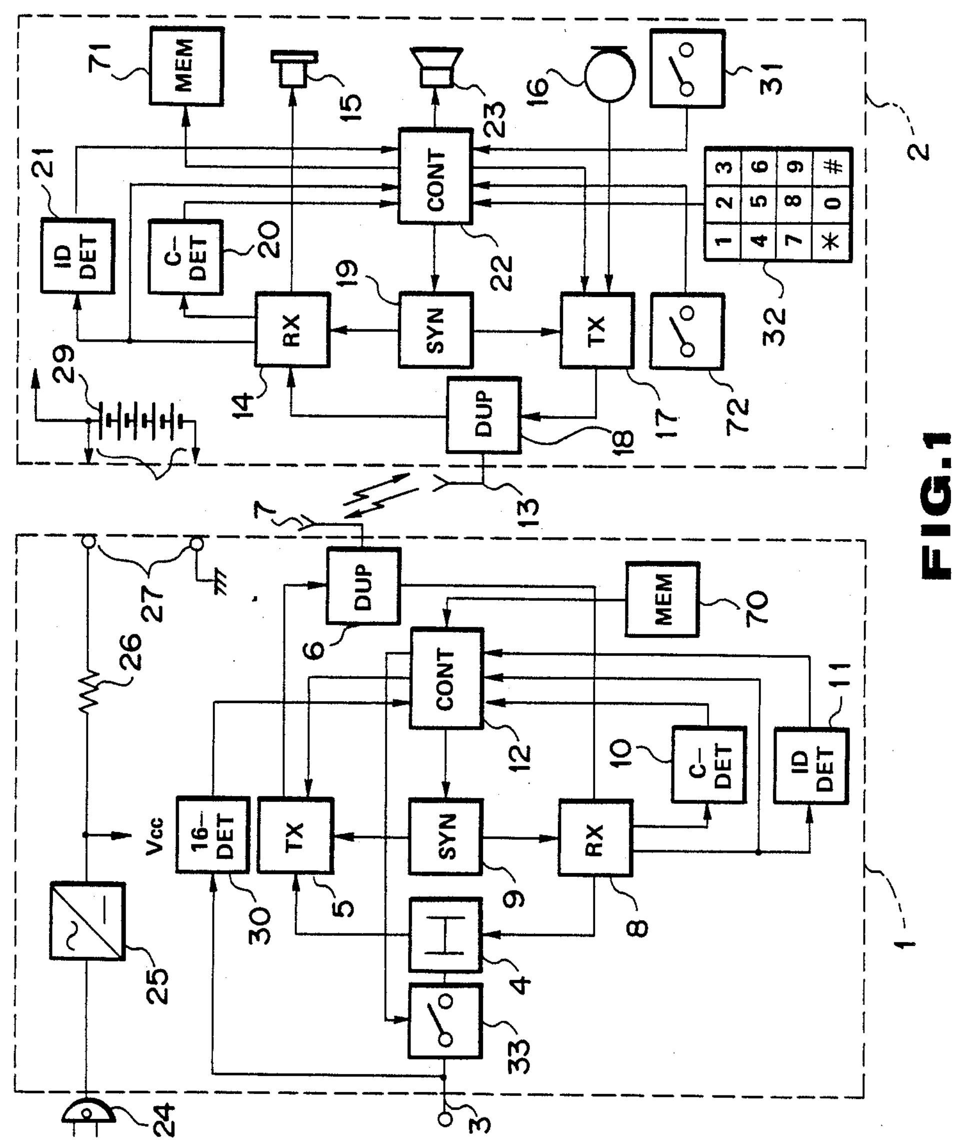
FIG. 1 is a block diagram of one embodiment of this invention.
Figure 7:
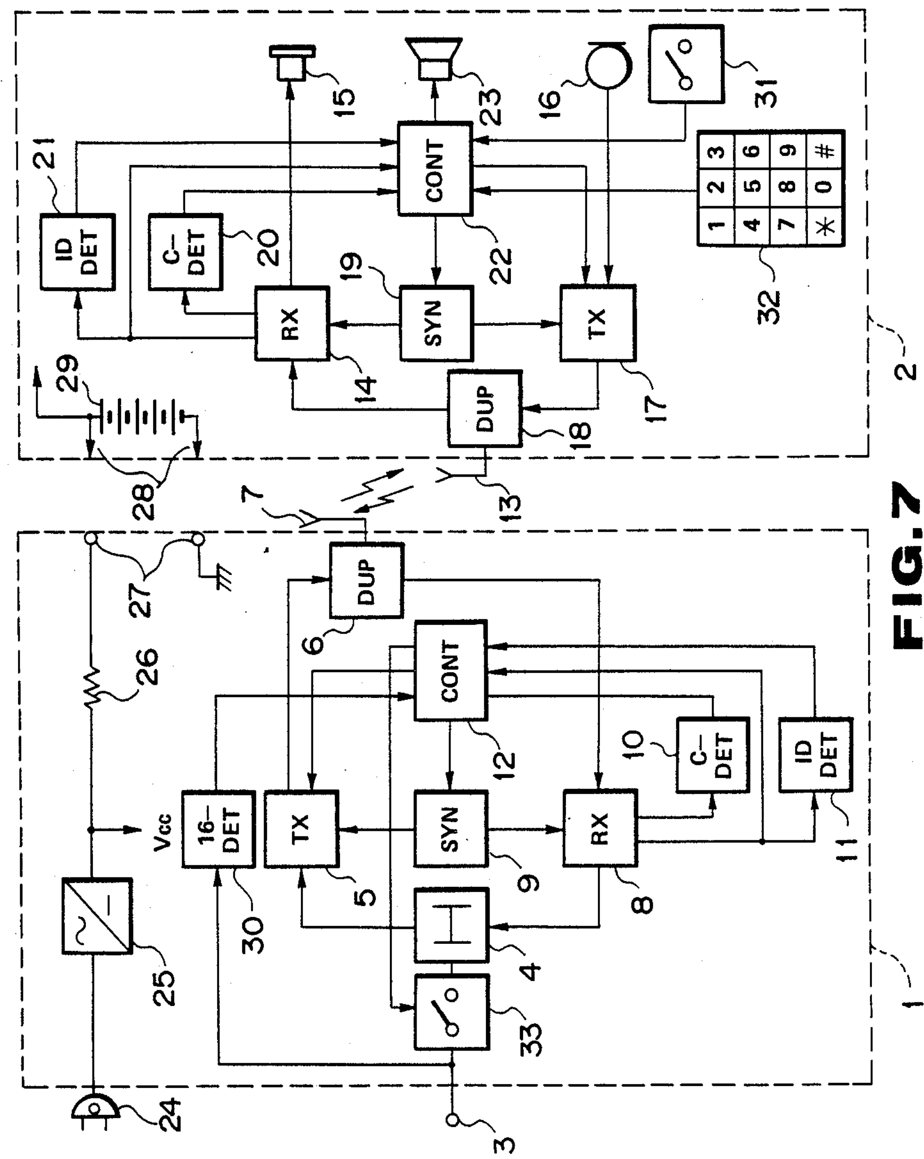
FIG. 7 is a block diagram of the structure of a conventional radio, communication apparatus.

FIG. 1 is a block diagram of an embodiment of this invention and is the same as FIG. 7 except that the base unit 1 and radio telephone 2 have memories 70 and 71, respectively, which store control channels C-CH used next time connection control is performed. Furthermore, synthesizers 9 and 19 are capable of setting the transmit and receive frequencies of the transmitting and receiving units to the frequencies of two control channels C1 and C2. While in the particular embodiment an on-hook switch 72 is provided at the radio telephone 2, it is omitted in the conventional structure for convenience of description.

Figure 2:
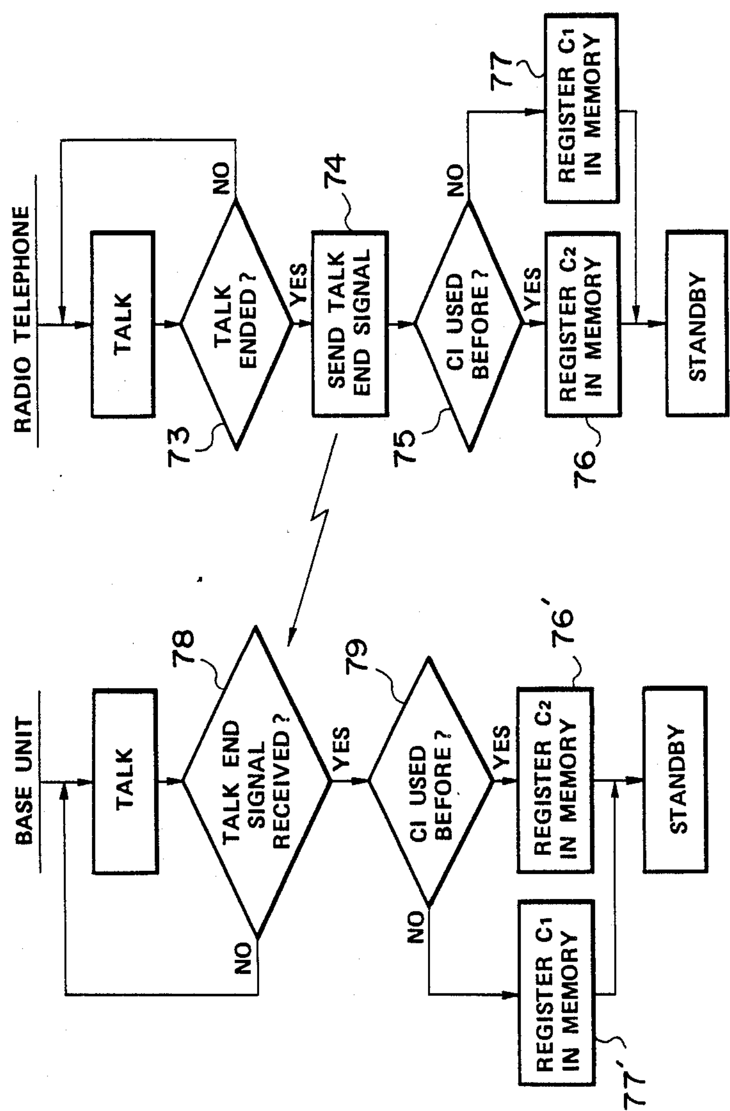
FIG. 2 is a flowchart showing the essential portion of the connection processing performed when the preservation of a control channel used next time is performed at the talk termination.

FIG. 2 is a flowchart showing the operation of the embodiment of FIG. 1 when a talk is terminated. When the control circuit 22 of radio telephone 2 detects that the on-hook switch 72 is operated to thereby terminate the talk (step 73), it sends out a talk end signal to the base unit 1 (step 74). Thereafter, the control circuit 22 checks to see if the control channel used for the connection control before the talk ends is C1 or C2 (step 75). If the control channel is C1, C2 is registered in the memory 71 as the control channel to be used next time (step 76). If the control channel that was used for connection control is C2, C1 is registered in the memory 71 (step 77) and the control circuit 22 returns to its standby position.

If the base unit 1 receives a talk end signal (step 78), it checks to see if the control channel used for the connection control before the talk ends is C1 or C2 as in the radio telephone 2. If the control channel that was used for connection control is C1, C2 is registered in the memory 70 as the control channel to be used next times, while if the control channel that was used for connection control is C2, C1 is registered in the memory 70, and thus the base unit 1 returns to its standby position (steps 79, 76', 77').

As just described above, by alternate use of control channels C1 and C2, either one of the control channels tends to be unoccupied to thereby ensure a quantity of traffic satisfying the number of talking channels.

Figure 3:
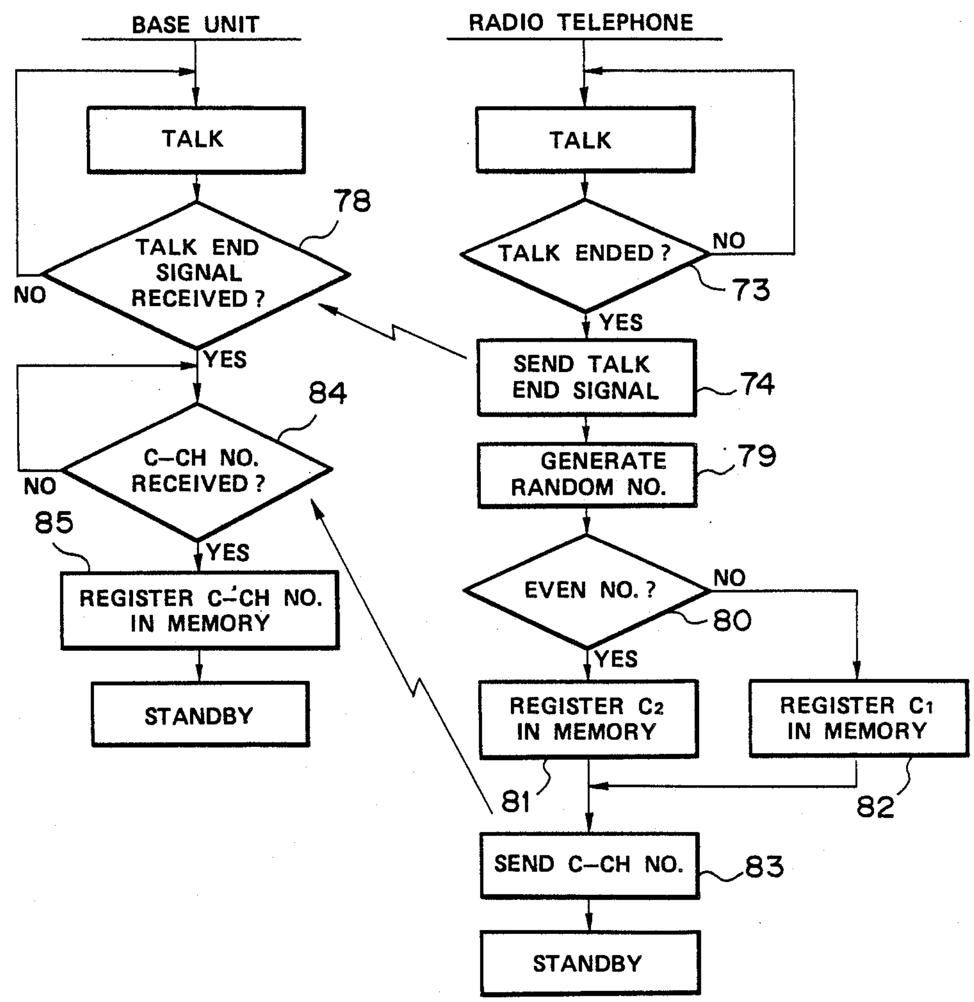
FIG. 3 is a flowchart showing the essential portion of connection processing comprising a modification of the flowchart of FIG. 2.

Instead of alternate use of control channels C1 and C2, the arrangement may be as shown in the flowchart of FIG. 3. A random number is generated after transmission of the talk end signal (step 79), so that C2 is registered in the memory 71 as the control channel be used next time if the random number is even, and C1 is registered if the random number is odd (steps 80–82). The number of the control channel that is stored (C-CH) is then transmitted to the base unit 1 (step 83), and the base unit 1 registers the received number of the control channel in the memory 70 (steps 84, 85).

This serves to reduce the probability of a plurality of radio communication devices competing with each other for a control channel to thereby further decrease cross talk. Furthermore, this serves to prevent a non-coincidence between the control channels to be used for connection control time by the base unit 1 and telephone 2 of the same device.

Figure 8A:
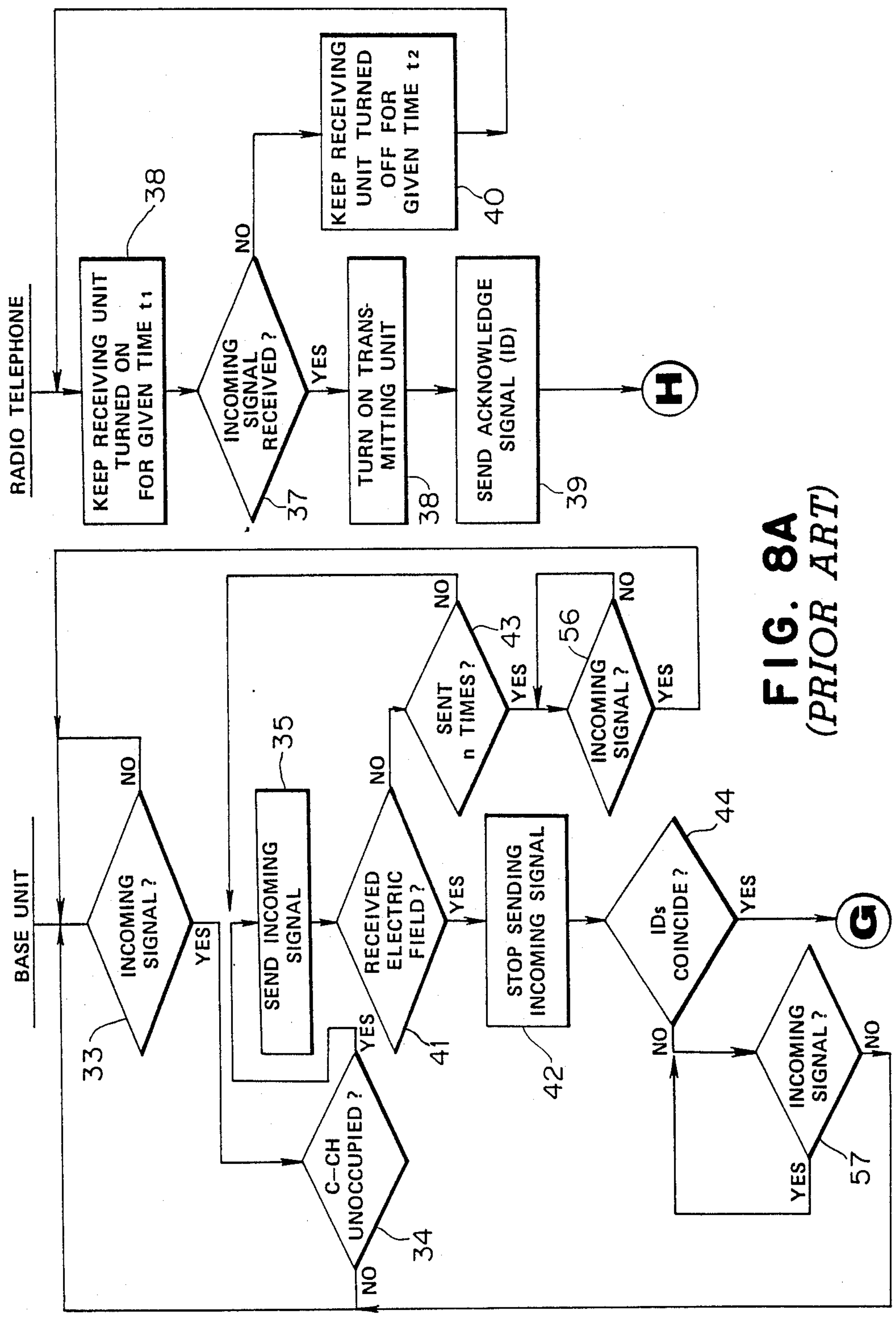
FIGS. 8 and 9 are flowcharts showing the transmission/reception of signals in the conventional radio communication apparatus.
Figure 8B:
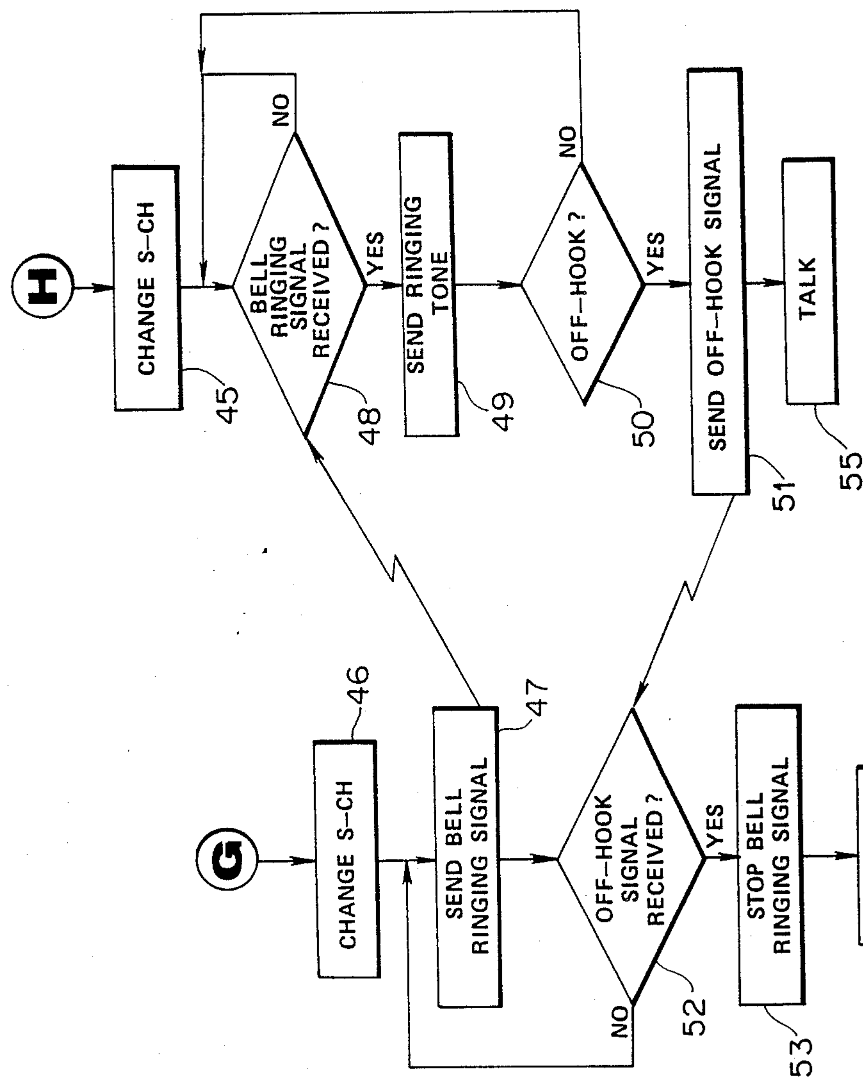
Figure 9:
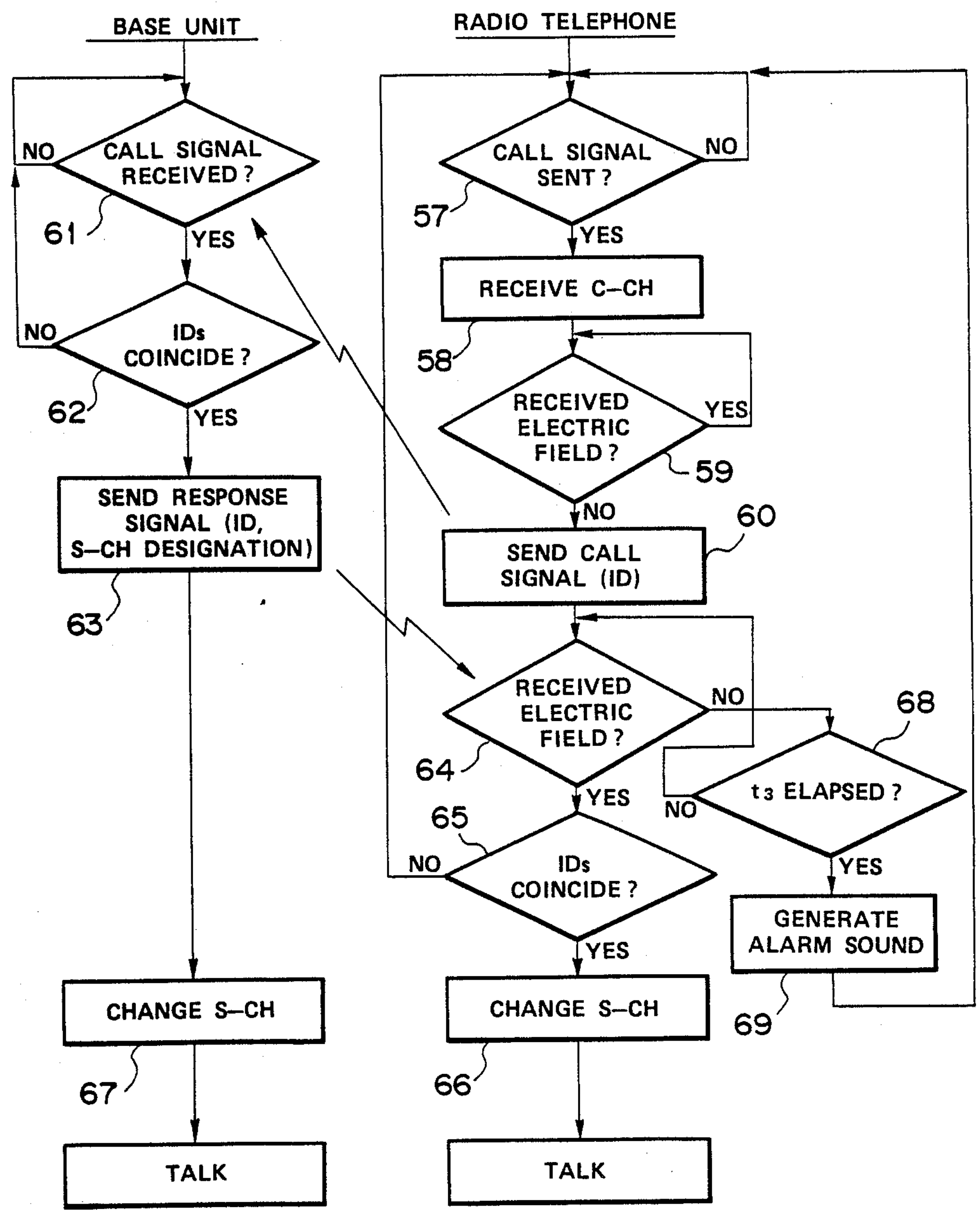
Figure 10:
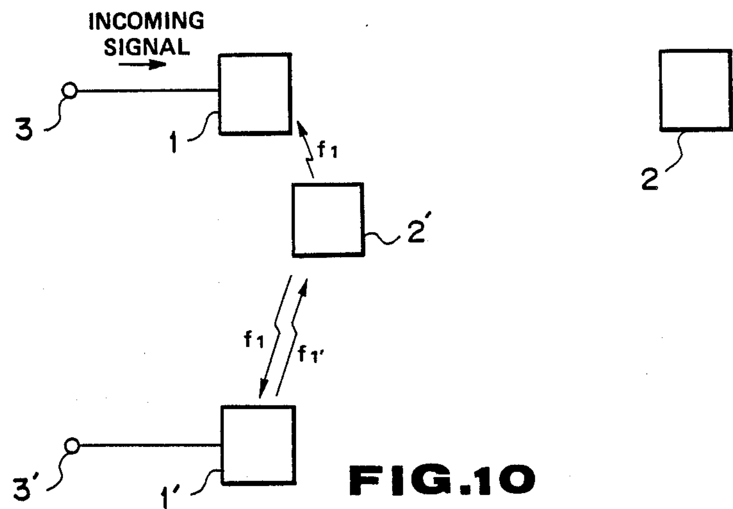
FIGS. 10 and 11 illustrate problems occurring when a plurality of radio communication devices are disposed close to each other.

In either of the flowcharts of FIGS. 2 and 3, the base unit 1 and telephone 2 use the control channel number stored in the memories 70 and 71 to perform the connection processing shown in FIGS. 8 and 9.

Figure 4:
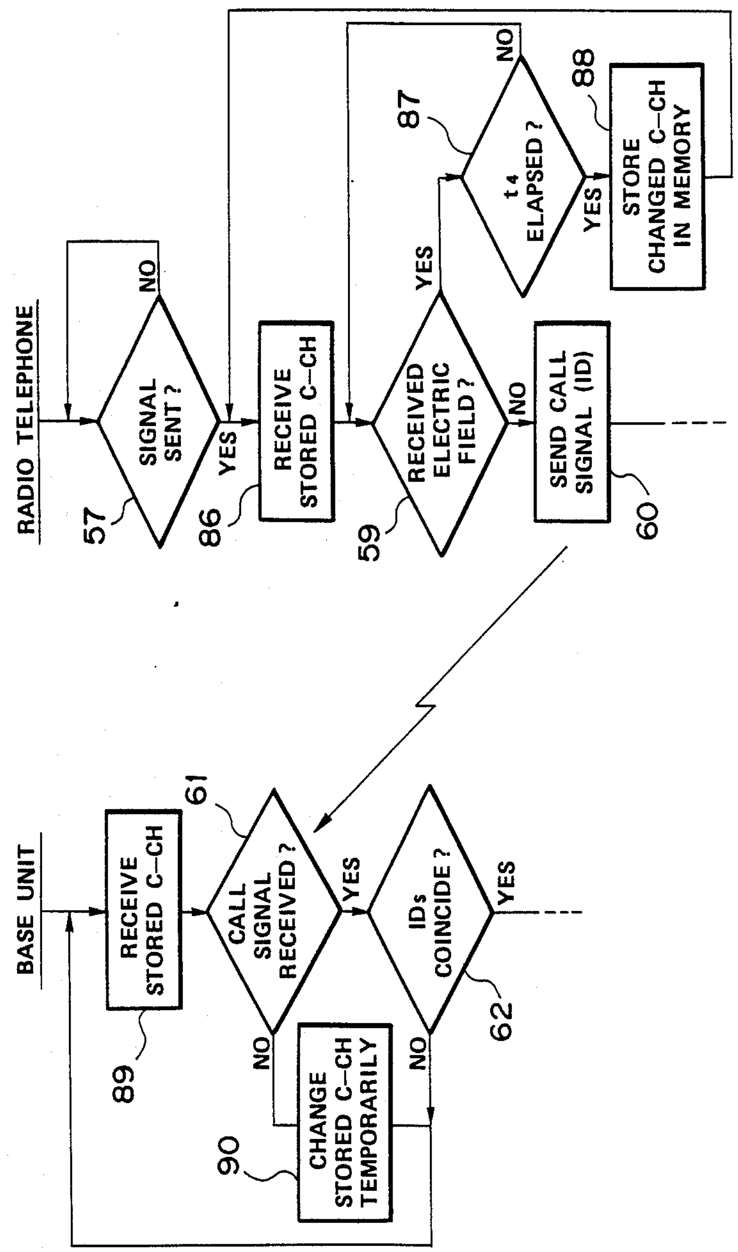
FIGS. 4–6 are flowcharts showing the essential portion of connection processing by which a preserved control channel is changed at the start of the transmission.

FIG. 4 is a flowchart showing the processing performed when the control channel corresponding to the number stored in memory is not unoccupied. If a signal is transmitted, the telephone 2 receives this signal using the control channel, the number of which is stored in the memory 71 (steps 57, 86). As a result, unless an electric wave is received by the control channel, for example, C1, the number of which is stored in the memory 71, the telephone 2 determines that the control channel C1 is unoccupied and starts to transmit an identification signal, etc. However, if electric waves are received by the control channel C1 and the channel C1 is not unoccupied, the telephone 2 checks to see if the electric waves received at the channel C1 continue to be received over the time interval t4 (steps 59, 87). If so, the control channel C1, the number of which is stored in the memory 71, is changed to another control channel, for example, C2 (step 88), and the telephone detects the presence of a received electric field using the new C2 control channel. If there is no received electric field, the telephone uses control channel C2 to start to transmit an identification signal, etc.

On the other hand, the base unit 1 performs reception using the control channel, for example, C1, the number of which stored in the memory 70. If the base unit 1 does not receive an identification signal, etc., using C1, it changes the control channel C1, the number of which is stored in the memory 70, to C2 (step 90) and checks the presence of the call (identification) signal using C2. As a result, if the call signal is detected on channel C2, the telephone determines whether the identification codes coincide and performs the subsequent connection control.

As described above, before the control channel corresponding to the number stored the memory 70 or 71 is used, it is reconfirmed that the control channels are actually unoccupied. If not, the channel is changed to another control channel, to avoid a state in which connection cannot be performed due to cross talk/mutual interference.

Figure 5:
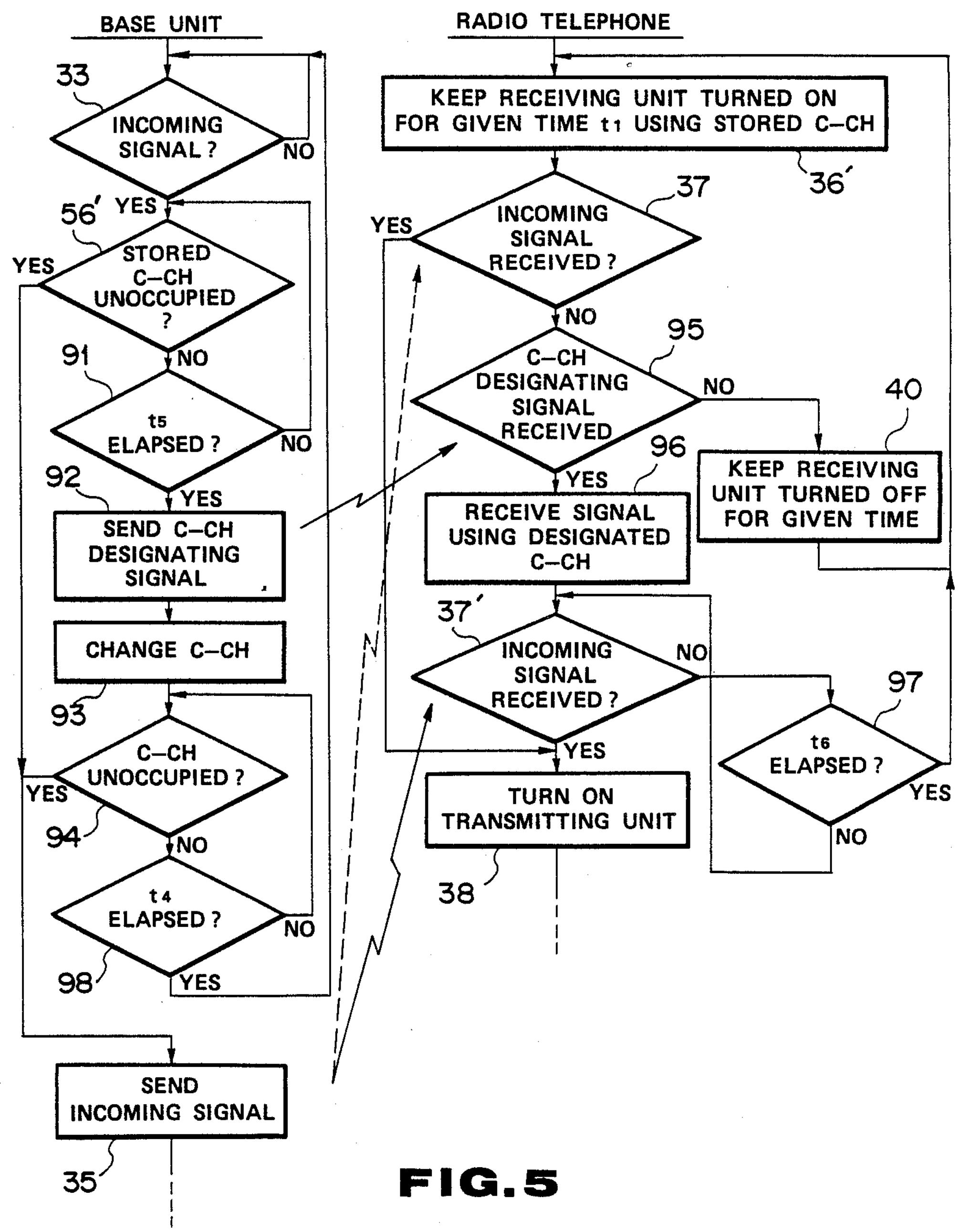

FIG. 5 is a flowchart showing the processing performed when there is no unoccupied control channel, for example, C1, registered in the memory 70 on reception of a signal from the telephone line 3. When there is an incoming signal from the telephone line 3 and the control channel C1, the number of which is stored in the memory 70, is occupied (steps 33, 56'), the base unit 1 determines whether the occupation continues over a time interval t5 (step 91). If so, the base unit 1 transmits to the radio telephone 2 a signal designating a control channel, for example, C2, other than C1 (step 92), changes its own control channel to C2, and checks to see if the channel C2 is unoccupied (steps 93, 94). As a result, if the control channel C2 is unoccupied, the base unit transmits the incoming signal to telephone 2 (steps 94, 35). However, if not unoccupied, the base unit again checks to see if the control channel is unoccupied after a lapse of time t4. When the base unit detects that the control channel is unoccupied, it transmits the incoming signal using the control channel C2 (steps 94, 98).

If the telephone 2 receives the control channel designating signal, it performs reception using the designated control channel C2 (step 37, 95, 96), turns on the transmitting unit 17 if incoming signal is received, and transmits an acknowledge signal (step 37', 38). However, if the incoming signal is not received by the designated control channel C2, the telephone checks to see if such state continues over the time t6 (step 97). If not, the telephone continues to monitor the arrival of an incoming signal through the control channel C2. However, if there is no incoming signal received after a lapse of more than t6, the telephone returns the control channel C2 to C1 to remain on standby using this original control channel.

By such control, an inability in connection due to cross talk and mutual interference by electric waves is prevented.

Figure 6A:
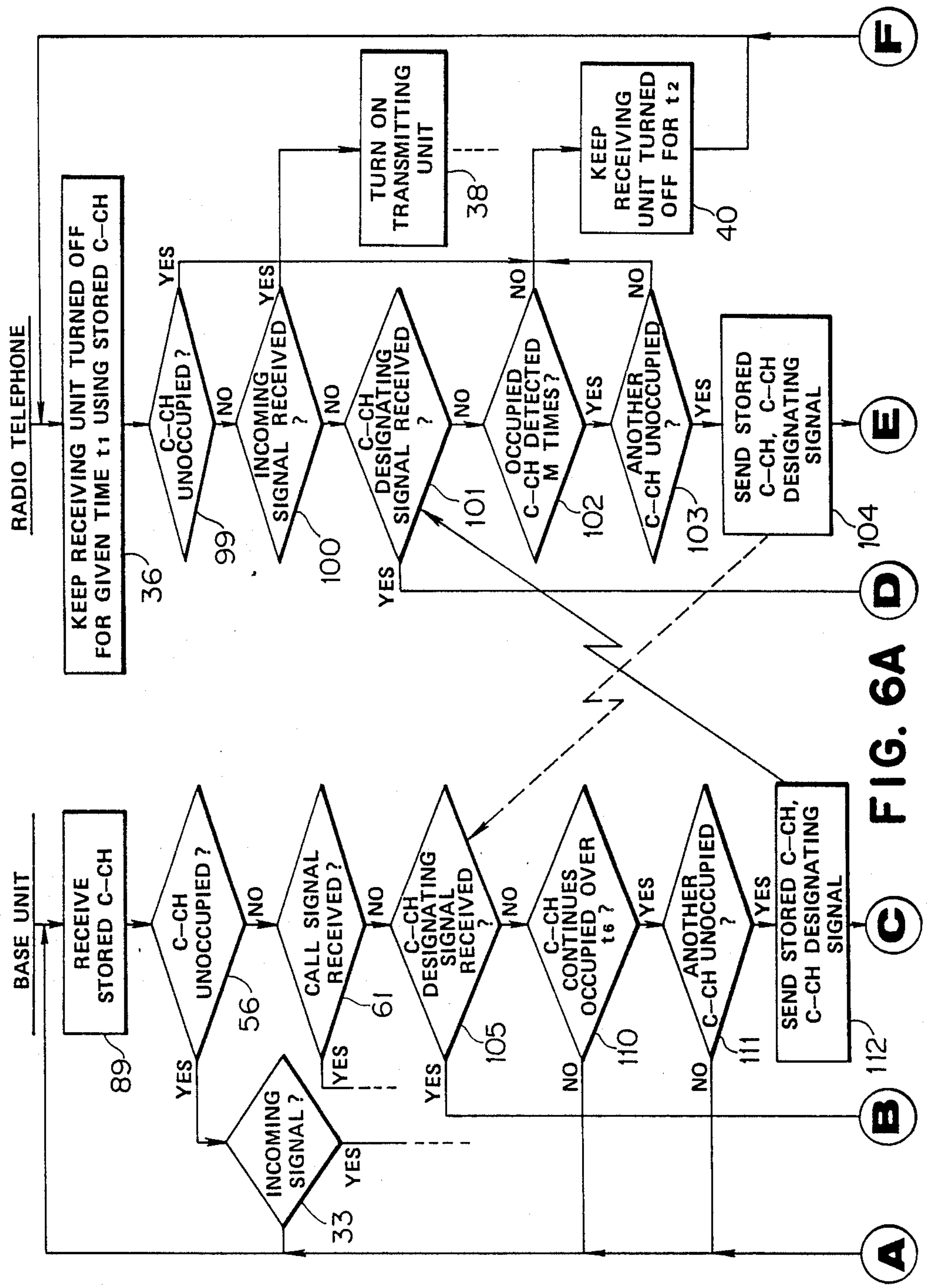
Figure 6B:
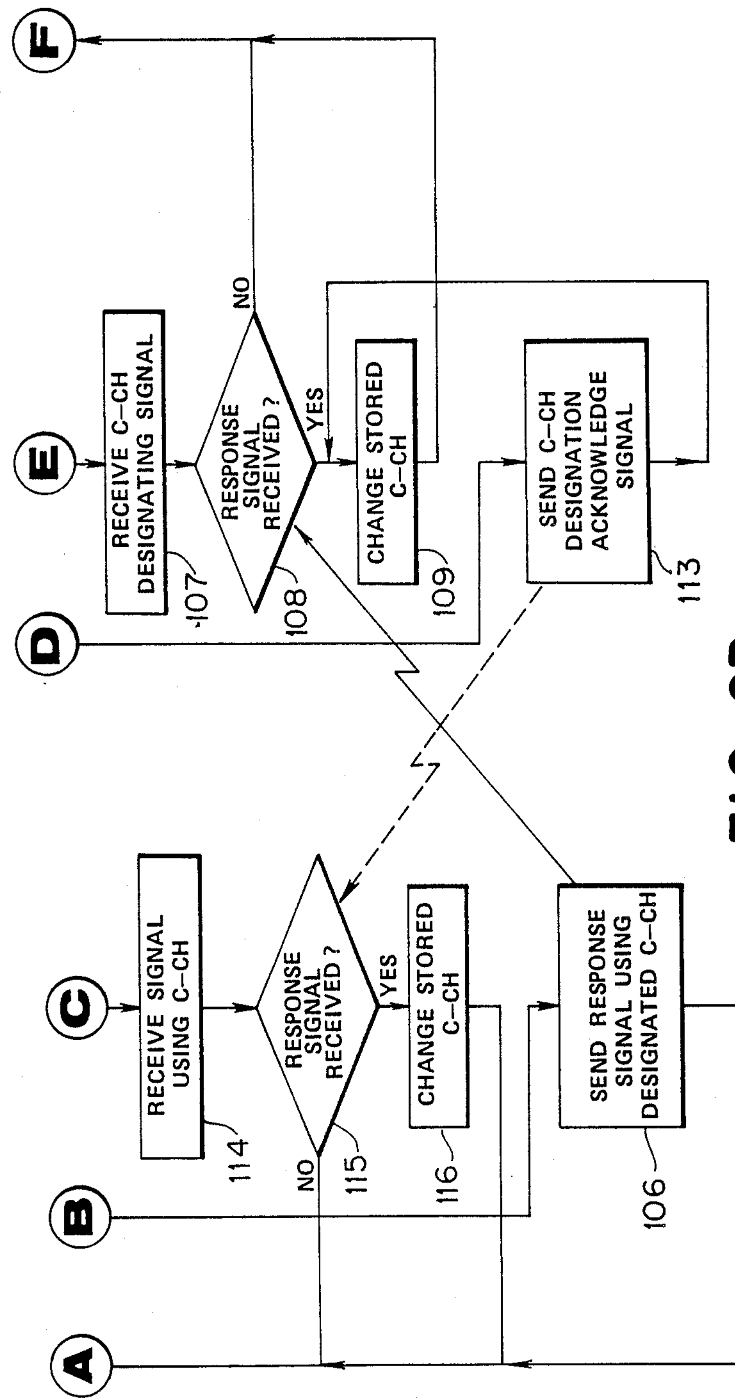

While in that case, in FIGS. 4 and 5, the control channel is changed when signals are transmitted and received, such change of control channels may be performed in the standby state, as shown in the flowchart of FIG. 6.

If (1) there is no unoccupied preserved control channel, for example, C1, registered in the memory 71 (step 99), (2) neither an incoming signal nor a control channel designating signal can be received (steps 100, 101 , (3) the receiving unit 14 is turned on m times successively, and (4) the occupation of control channel C1 is detected m times successively (step 102), the telephone 2 determines that there is cross talk or competition for the control channel C1, and checks to see if another control channel C2 is unoccupied (step 103). As a result, if C2 is unoccupied, the telephone sends a signal designating the control channel C2 using C1 (step 104).

If the base unit 1 receives a signal designating C2 (step 105), it sends a response signal using the designated control channel C2 (step 106). After the telephone 2 has transmitted the signal designating C2, it puts the receiving unit 14 in its standby state, in which the control channel C2 is used for receiving purposes. If the receiving unit 14 receives the response signal by using the control channel C2 (step 108), it changes to C1 the control channel C2 registered in the memory 71, and returns to the standby state, in which C1 is used for receiving purposes.

If the occupation of the control channel C1 has not yet been detected m times or C2 is also occupied, the receiving unit 14 is once turned off (step 40), and similar operations are repeated. If the control channel, for example, C1, registered in the memory 70 is not unoccupied (step 56') in the base unit 1 and neither the call signal nor the control channel designating signal from the telephone 2 can be received (steps 61, 105), the base unit checks to see if the occupation of the control channel C1 continues over the time interval t6 (step 110). If so, the base unit checks to see if another control channel C2 is unoccupied. If so, the base unit transmits a signal designating the control channel C2 using the control channel C1 (steps 111, 112) and, when the base unit receives a response signal to the transmission of the designating signal, it changes the number of the control channel C1 registered in the memory 70 to the number of the control channel C2 (steps 114–116).

By such operation, the base unit is capable of transmitting and receiving signals using the new changed control channel even if the registered control channel is occupied.

Figure 11:
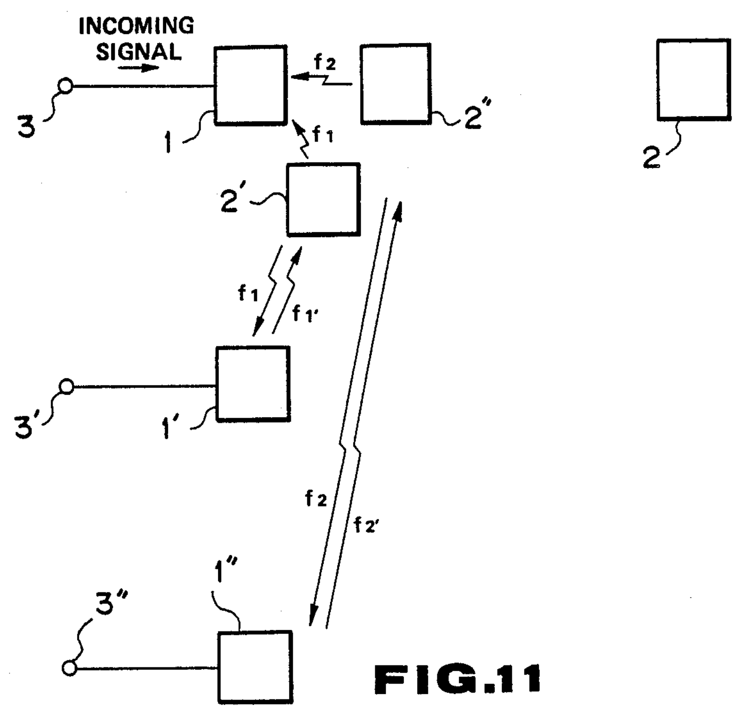

In FIG. 6, a signal designating a new control channel C2 is transmitted using the original control channel C1. As is seen from FIG. 11, this is so because when the base unit 1 suffers from interference, the reception using the control channel C1 is influenced by cross talk while the transmission using C1 is less influenced because f1 and f2 are different frequencies.

While in the above embodiment two control channels are used for convenience of description, three or more control channels may be used, of course. The conditions for changing the registered control channel may be that the percentage of occupation in a predetermined time interval is, for example, 80% or more, or that the frequency of occupation in a predetermined number of receptions is more than a preset value, instead of the condition that the control channel is continuously occupied over a predetermined time interval. In summary, if an arrangement is provided such that a single control channel is not used excessively, it is possible to avoid a wait for connection control even if cross talk may occur in transmission and reception. As a result, a quantity of traffic sufficient for the number of talking channels is ensured.

This invention is similarly applicable to systems other than devices handling voice, such as radio data transmission terminals which transmit and receive data signals.

What is claimed is:

1. A radio communication system comprising:

a plurality of control channel means different in frequency;

a plurality of radio communication devices, each including a base unit and a radio terminal unit coupled thereto via a radio circuit;

each base unit includes:

a first memory for storing data on one control channel selected among the plurality of control channel means;

first control means using the control channel means, the data on which is stored in the first memory, for establishing a radio circuit between the base unit and the radio terminal unit corresponding to the base unit;

first change means for changing the reception control channel means to a different control channel means when the control channel stored in the first memory is occupied over a predetermined time, wherein the first change means includes means for returning the reception channel to the control channel means, the data on which is stored in the first memory, on the condition that there is an incoming signal when the changed control channel means is occupied over a predetermined time;

means for transmitting a channel designating signal which reports the changed control channel means to the corresponding radio terminal unit; and the radio terminal unit of each communication device includes:

a second memory for storing the same control channel data as the data on the control channel stored in the first memory of the base unit corresponding to that radio terminal unit;

second control means using the control channel means, the data on which is stored in the second memory, for establishing a radio circuit between the radio terminal unit and the base unit corresponding to that radio terminal unit; and second change means for changing the reception control channel to the control channel means reported by the channel designating signal.

2. A radio communication system comprising:

a plurality of control channel means different in frequency;

a plurality of radio communication devices, each including a base unit and a radio terminal unit coupled thereto via a radio circuit;

each base unit includes;

a first memory for storing data on one control channel selected among the plurality of control channel means;

first control means using the control channel means, the data on which is stored in the first memory, for establishing a radio circuit between the base unit and the radio terminal unit corresponding to the base unit;

first change means for changing the reception control channel means to a different control channel means when the control channel stored in the first memory is occupied over a predetermined time;

means for transmitting a channel designating signal which reports the changed control channel means to the corresponding radio terminal unit; and the radio terminal unit of each communication device includes:

a second memory for storing the same control channel data as the data on the control channel stored in the first memory of the base unit corresponding to that radio terminal unit;

second control means using the control channel means, the data on which is stored in the second memory, for establishing a radio circuit between the radio terminal unit and the base unit corresponding to that radio terminal unit; and second change means for changing the reception control channel to the control channel means reported by the channel designating signal, wherein the second change means includes means for returning the reception channel to the control channel means, the data on which is stored in the second memory, when the changed control means receives no incoming signal in a predetermined time.

3. A radio communication system comprising:

a plurality of control channel means different in frequency;

a plurality of radio base unit, each including a base unit and a radio terminal unit coupled thereto via a radio circuit;

each communication device includes:

a first memory for storing number of one control channel selected among the plurality of control channels means;

first control means using the control channel means, the number of which is stored in the first memory, for establishing a radio circuit between that base unit and the radio terminal unit corresponding to the base unit; and means for sending a first channel designating signal designating another unoccupied control channel which is assumed to be present when the control channel means, the data of which is stored in the first memory, is occupied over a predetermined time;

means for receiving a second response signal to the first channel designating signal from the radio terminal unit;

first rewriting means for rewriting the content stored in the first memory with the number of the control channel means designated by the first channel designating signal in response to reception of the second response signal; and means for sending a first response signal in response to a second channel designating signal from the radio terminal unit;

the radio terminal unit of each radio communication device comprises:

intermittent control means for performing an intermittent reception by turning on and off the receiving unit;

a second memory for storing the same control channel data as the number of the control channel stored in the first memory of the base unit corresponding to the radio terminal unit;

second control means using the control channel means, the number of which is stored in the second memory, for establishing a radio circuit between the radio terminal unit and the base unit corresponding to that radio terminal unit;

means for sending a second channel designating signal designating another unoccupied control channel means which is assumed to be present when the state in which the receiving unit receives none of an incoming signal and a channel designating signal during its on time interval is repeated by a predetermined number of times; and second rewriting means for sending the second response signal when the first channel designating signal is received and for rewriting the contents stored in the second memory with the data on the control channel designated by the first channel designating signal.

4. A radio communication system comprising:

a plurality of radio communication devices, wherein a unique identification code is allocated to each radio communication device, wherein each radio communication device includes a base unit coupled to a radio telephone via a radio circuit, wherein a plurality of talking channel frequencies is used to transmit and receive voice or data signals, and wherein a plurality of control channel frequencies different from the plurality of talking channel frequencies is used to control connection between the base unit and the radio telephone in each radio communication device;

each base unit comprising:

base receiver means, for receiving an identification signal transmitted to the base unit from the radio telephone at times when the base receiver means is set at a selected one of the plurality of control channel frequencies, and for receiving voice or data signals transmitted to the base unit from the radio telephone at times when the base receiver means is set at a selected one of the plurality of talking channel frequencies;

base received field detection means, coupled to the base receiver means, for determining whether the selected control channel frequency is occupied;

base identification detection means, coupled to the base receiver means, for determining whether an identification signal transmitted to the base unit from the radio telephone corresponds to the identification code allocated to the radio communication device;

base transmitter means, for transmitting an identification signal corresponding to the identification code allocated to the radio communication device from the base unit to the radio telephone at times when the base transmitter means is set at the selected control channel frequency, and for transmitting voice or data signals from the base unit to the radio telephone at times when the base transmitter means is set at the selected talking channel frequency; and base control means, coupled to the base receiver means, the base received field detection means, the base identification detection means, and the base transmitter means, for selecting the control channel frequency, for setting the frequency of the base receiver means and the base transmitter means to the selected control channel frequency to control connection between the base unit and the radio telephone, for changing the control channel frequency of the base receiver means and the base transmitter means to another one of the plurality of control channel frequencies at times when the selected control channel frequency is occupied, and for setting the frequency of the base receiver means and the base transmitter means to the selected talk channel frequency to transmit and receive said voice or data signals;

and each radio telephone comprising:

telephone receiver means, for receiving an identification signal transmitted to the radio telephone from the base unit at times when the telephone receiver means is set at the selected control channel frequency, and for receiving voice or data signals transmitted to the radio telephone from the base unit at times when the telephone receiver means is set at the selected talking channel frequency;

telephone received filed detection means, coupled to the telephone receiver means, for determining whether the selected control channel frequency is occupied;

telephone identification detection means, coupled to the telephone receiver means, for determining whether an identification signal transmitted to the radio telephone from the base unit corresponds to the identification code allocated to the radio communication device;

telephone transmitter means, for transmitting an identification signal corresponding to the identification code allocated to the radio base unit from the radio telephone to the base unit at times when the telephone transmitter means is set at the selected control channel frequency, and for transmitting voice or data signals from the radio telephone to the base unit at times when the telephone transmitter means is set at the selected talking channel frequency; and telephone control means, coupled to the telephone receiver means, the telephone received field detection means, the telephone identification detection means, and the telephone transmitter means, for selecting the control channel frequency, for setting the frequency of the telephone receiver means and the telephone transmitter means to the selected control channel frequency to control connection between the base unit and the radio telephone, for changing the control channel frequency of the telephone receiver means and the telephone transmitter means to another one of the plurality of control channel frequencies at times when the selected control channel frequency is occupied, and for setting the frequency of the telephone receiver means and the telephone transmitter means to the selected talk channel frequency to transmit and receive said voice or data signals.

5. A radio communication system according to claim 4, in which:

the base control means sets the frequency of the base receiver means and the base transmitter means to the selected talk channel frequency after an identification signal corresponding to the identification code allocated to the radio communication device is detected by the base identification detection means and after the identification signal is transmitted from the base unit; and the telephone control means sets the frequency of the telephone receiver means and the telephone transmitter means to the selected talk channel frequency after an identification signal corresponding to the identification code allocated to the radio communication device is detected by the telephone identification detection means and after the identification signal is transmitted from the radio telephone.

6. A radio communication system according to claim 5, wherein the base control means and the telephone control means select one of the plurality of control channel frequencies each time telephone communication ends between the base unit and the radio telephone.

7. A radio communication system according to claim 4, wherein the base control means and the telephone control means select one of the plurality of control channel frequencies each time telephone communication ends between the base unit and the radio telephone.

8. A radio communication system according to claim 5, in which:

the base transmitter means transmits an S-CH signal designating the selected talking channel frequency from the base unit tot he radio telephone at the selected control channel frequency;

the telephone receiver means receives the S-CH signal designating the selected talking channel frequency from the base unit at times when the telephone receiver means is set at the selected control channel frequency;

the base control means sets the frequency of the base receiver means and the base transmitter means to the selected talk channel frequency designated by the S-CH signal; and the telephone control means sets the frequency of the telephone receiver means and the telephone transmitter means to the selected talk channel frequency designated by the S-CH signal.

9. A radio communication system according to claim 4, in which:

the base transmitter means transmits an S-CH signal designating the selected talking channel frequency from the base unit to the radio telephone at the selected control channel frequency;

the telephone receiver means receives the S-CH signal designating the selected talking channel frequency from the base unit at time when the telephone receiver means is set at the selected control channel frequency;

the base control means sets the frequency of the base receiver means and the base transmitter means to the selected talk channel frequency designated by the S-CH signal; and the telephone control means sets the frequency of the telephone receiver means and the telephone transmitter means to the selected talk channel frequency designated by the S-CH signal.

10. A radio communication system according to claim 5, in which:

the telephone transmitter means transmits an S-CH signal designating the selected talking channel frequency from the radio telephone to the base unit at the selected control channel frequency;

the base receiver means receives the S-CH signal designating the selected talking channel frequency from the radio telephone at times when the base receiver means is set at the selected control channel frequency;

the telephone control means sets the frequency of the telephone receiver means and the telephone transmitter means to the selected talk channel frequency designated by the S-CH signal; and the base control means sets the frequency of the base receiver means and the base transmitter means to the selected talk channel frequency designated by the S-CH signal.

11. A radio communication system according to claim 4, in which:

the telephone transmitter means transmits an S-CH signal designating the selected talking channel frequency from the radio telephone to the base unit at the selected control channel frequency;

the base receiver means receives the S-CH signal designating the selected talking channel frequency from the radio telephone at times when the base receiver means is set at the selected control channel frequency;

the telephone control means sets the frequency of the telephone receiver means and the telephone transmitter means to the selected talk channel frequency designed by the S-CH signal; and the base control means sets the frequency of the base receiver means and the base transmitter means to the selected talk channel frequency designated by the S-CH signal.

12. A radio communication system according to claim 11, and further comprising:

base storage means, coupled to the base control means, for storing a base control channel number corresponding to the selected control channel; and base rewriting means, coupled to the base storage means, for changing the base control channel number to a base control channel number corresponding to another one of the plurality of control channel frequencies at times when the selected control channel frequency is occupied.

13. A radio communication system according to claim 9, and further comprising:

base storage means, coupled to the base control means, for storing a base control channel number corresponding to the selected control channel; and base rewriting means, coupled to the base storage means, for changing the base control channel number to a base control channel number corresponding to another one of the plurality of control channel frequencies at times when the selected control channel frequency is occupied.

14. A radio communication system according to claim 7, and further comprising:

base storage means, coupled to the base control means, for storing a base control channel number corresponding to the selected control channel; and base rewriting means, coupled to the base storage means, for changing the base control channel number to a base control channel number corresponding to another one of the plurality of control channel frequencies at times when the selected control channel frequency is occupied.

15. A radio communication system according to claim 5, and further comprising:

base storage means, coupled to the base control means, for storing a base control channel number corresponding to the selected control channel; and base rewriting means, coupled to the base storage means, for changing the base control channel number to a base control channel number corresponding to another one of the plurality of control channel frequencies at times when the selected control channel frequency is occupied.

16. A radio communication system according to claim 4, and further comprising:

base storage means, coupled to the base control means, for storing a base control channel number corresponding to the selected control channel; and base rewriting means, coupled to the base storage means, for changing the base control channel number to a base control channel number corresponding to another one of the plurality of control channel frequencies at times when the selected control channel frequency is occupied.

17. A radio communication system according to claim 16, and further comprising:

telephone storage means, coupled to the telephone control means, for storing a telephone control channel number corresponding to the selected control channel; and telephone rewriting means, coupled to the telephone storage means, for changing the telephone control channel number to a telephone control channel number corresponding to another one of the plurality of control channel frequencies at times when the selected control channel frequency is occupied.

18. A radio communication system according to claim 11, and further comprising:

telephone storage means, coupled to the telephone control means, for storing a telephone control channel number corresponding to the selected control channel; and telephone rewriting means, coupled to the telephone storage means, for changing the telephone control channel number to a telephone control channel number corresponding to another one of the plurality of control channel frequencies at times when the selected control channel frequency is occupied.

19. A radio communication system according to claim 9, and further comprising:

telephone storage means, coupled to the telephone control means, for storing a telephone control channel number corresponding to the selected control channel; and telephone rewriting means, coupled to the telephone storage means, for changing the telephone control channel number to a telephone control channel number corresponding to another one of the plurality of control channel frequencies at times when the selected control channel frequency is occupied.

20. A radio communication system according to claim 7, and further comprising:

telephone storage means, coupled to the telephone control means, for storing a telephone control channel number corresponding to the selected control channel; and telephone rewriting means, coupled to the telephone storage means, for changing the telephone control channel number to a telephone control channel number corresponding to another one of the plurality of control channel frequencies at times when the selected control channel frequency is occupied.

21. A radio communication system according to claim 5, and further comprising:

telephone storage means, coupled to the telephone control means, for storing a telephone control channel number corresponding to the selected control channel; and telephone rewriting means, coupled to the telephone storage means, for changing the telephone control channel number to a telephone control channel number corresponding to another one of the plurality of control channel frequencies at times when the selected control channel frequency is occupied.

22. A radio communication system according to claim 4, and further comprising:

telephone storage means, coupled to the telephone control means, for storing a telephone control channel number corresponding to the selected control channel; and telephone rewriting means, coupled to the telephone storage means, for changing the telephone control channel number to a telephone control channel number corresponding to another one of the plurality of control channel frequencies at times when the selected control channel frequency is occupied.

23. A radio communication system according to claim 12, in which:

the base transmitter means transmits a C-CH signal designating another one of the plurality of control channel frequencies at times when the selected control channel frequency is occupied;

the telephone receiver means receives of the C-CH signal designating another one of the plurality of control channel frequencies at times when the selected control channel frequency is occupied;

the base control means sets the frequency of the base receiver means and the base transmitter means to the control channel frequency designated by the C-CH signal; and the telephone control means sets the frequency of the telephone receiver means and the telephone transmitter means to the control channel frequency designated by the C-CH signal.

24. A radio communication system according to claim 4, in which:

the base transmitter means transmits a C-CH signal designating another one of the plurality of control channel frequencies at times when the selected control channel frequency is occupied;

the telephone receiver means receives the C-CH signal designating another one of the plurality of control channel frequencies at times when the selected control channel frequency is occupied;

the base control means sets the frequency of the base receiver means and the bas transmitter means to the control channel frequency designated by the C-CH signal; and the telephone control means sets the frequency of the telephone receive means and the telephone transmitter means to the control channel frequency designated by the C-CH signal.

25. A radio communication system according to claim 17, in which: p1 the telephone transmitter means transmits a C-CH signal designating another one of the plurality of control channel frequencies at times when the selected control channel frequency is occupied;

the base receiver means receives the C-CH signal designating another one of the plurality of control channel frequencies at times when the selected control channel frequency is occupied;

the telephone control means sets the frequency of the telephone receiver means and the telephone transmitter means to the control channel frequency designated by the C-CH signal; and the base control means sets the frequency of the base receiver means and the base transmitter means to the control channel frequency designated by the C-CH signal.

26. A radio communication system according to claim 4, in which:

the telephone transmitter means transmits a C-CH signal designating another one of the plurality of control channel frequencies at times when the selected control channel frequency is occupied;

the base receiver means receives the C-CH signal designating another one of the plurality of control channel frequencies at times when the selected control channel frequency is occupied;

the telephone control means sets the frequency of the telephone receive means and the telephone transmitter means to the control channel frequency designated by the C-CH signal; and the base control means sets the frequency of the base receiver means and the base transmitter means to the control channel frequency designated by the C-CH signal.

27. A radio communication system according to claim 17, wherein the base control means and the telephone control means select one of the plurality of control channel frequencies in accordance with a predetermined sequence.

28. A radio communication system according to claim 11, wherein the base control means and the telephone control means select one of the plurality of control channel frequencies in accordance with a predetermined sequence.

29. A radio communication system according to claim 9, wherein the base control means and the telephone control means select one of the plurality of control channel frequencies in accordance with a predetermined sequence.

30. A radio communication system according to claim 7, wherein the base control means and the telephone control means select one of the plurality of control channel frequencies in accordance with a predetermined sequence.

31. A radio communication system according to claim 5, wherein the base control means and the telephone control means select one of the plurality of control channel frequencies in accordance with a predetermined sequence.

32. A radio communication system according to claim 4, wherein the base control means and the telephone control means select one of the plurality of control channel frequencies in accordance with a predetermined sequence.

33. A radio communication system according to claim 32, wherein the plurality of control channel frequencies includes a first control channel frequency and a second control channel frequency, and both the base control means and the telephone control means alternately select the first and second control channel frequencies.

34. A radio communication system according to claim 31, wherein the plurality of control channel frequencies includes a first control channel frequency and a second control channel frequency, and both the base control means and the telephone control means alternately select the first and second control channel frequencies.

35. A radio communication system according to claim 30, wherein the plurality of control channel frequencies includes a first control channel frequency and a second control channel frequency, and both the base control means and the telephone control means alternately select the first and second control channel frequencies.

36. A radio communication system according to claim 29, wherein the plurality of control channel frequencies includes a first control channel frequency and a second control channel frequency, and both the base control means and the telephone control means alternately select the first and second control channel frequencies.

37. A radio communication system according to claim 25, wherein the plurality of control channel frequencies include a first control channel frequency and a second control channel frequency, and both the base control means and the telephone control means alternatively select the first and second control channel frequencies.

38. A radio communication system according to claim 27, wherein the plurality of control channel frequencies includes a first control channel frequency and a second control channel frequency, and both the base control means and the telephone control means alternately select the first and second control channel frequencies.

39. A radio communication system according to claim 26, wherein the telephone control means randomly selects one of the plurality of control channel frequencies;

wherein the telephone transmitter means transmits a C-CH signal designating the randomly selected control channel frequency;

wherein the base receiver means receives the C-CH signal designating the randomly selected control channel frequency; and wherein the base control means selects the randomly selected control channel frequency designated by the C-CH signal.

40. A radio communication system according to claim 25, wherein the telephone control means randomly selects one of the plurality of control channel frequencies;

wherein the telephone transmitter means transmits a C-CH signal designating the randomly selected control channel frequency;

wherein the base receiver means receives the C-CH signal designating the randomly selected control channel frequency; and wherein the base control means selects the randomly selected control channel frequency designated by the C-CH signal.

41. A radio communication system according to claim 24, wherein the base control means randomly selects one of the plurality of control channel frequencies;

wherein the base transmitter means transmits a C-CH signal designating the randomly selected control channel frequency;

wherein the telephone receiver means receives the C-CH signal designating the randomly selected control channel frequency; and wherein the telephone control means selects the randomly selected control channel frequency designated by the C-CH signal.

42. A radio communication system according to claim 23, wherein the base control means randomly selects one of the plurality of control channel frequencies;

wherein the base transmitter means transmits a C-CH signal designating the randomly selected control channel frequency;

wherein the telephone receiver means receives the C-CH signal designating the randomly selected control channel frequency; and wherein the telephone control means selects the randomly selected control channel frequency designated by the C-CH signal.

* * * * *